United States Patent
Tripathy (10) Patent No.: US 7,110,542 B1
(45) Date of Patent: Sep. 19, 2006

(54) PROTECTING AUDIO/VIDEO CONTENT DURING STORAGE AND PLAYBACK ON A PROCESSOR-BASED SYSTEM

(75) Inventor: Aurobindo Tripathy, Milpitas, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/475,868

(22) Filed: Dec. 30, 1999

(51) Int. Cl.
H04N 7/167 (2006.01)
G06F 12/14 (2006.01)

(52) U.S. Cl. .................. 380/201; 380/210; 380/212; 713/193; 713/194

(58) Field of Classification Search ........ 380/200–201, 380/210, 233, 212, 223, 216, 239; 713/193–194
See application file for complete search history.

(56) References Cited

U.S. PATENT DOCUMENTS

| | | | |
|---|---|---|---|
| 5,742,680 A * | 4/1998 | Wilson | 380/227 |
| 6,061,451 A * | 5/2000 | Muratani et al. | 380/201 |
| 6,064,739 A * | 5/2000 | Davis | 380/200 |
| 6,289,455 B1 * | 9/2001 | Kocher et al. | 713/194 |
| 6,305,018 B1 * | 10/2001 | Usui et al. | 725/49 |
| 6,351,538 B1 * | 2/2002 | Uz | 380/201 |
| 6,363,149 B1 * | 3/2002 | Candelore | 380/45 |
| 6,577,734 B1 * | 6/2003 | Etzel et al. | 380/277 |
| 6,714,649 B1 * | 3/2004 | Masuda et al. | 380/44 |
| 2001/0008016 A1 * | 7/2001 | Kotani et al. | 713/193 |
| 2002/0188567 A1 * | 12/2002 | Candelore | 705/51 |

\* cited by examiner

*Primary Examiner*—Emmanuel L. Moise
*Assistant Examiner*—Minh Dieu Nguyen
(74) *Attorney, Agent, or Firm*—Sharmini N. Green (57) ABSTRACT

A system for protecting audio/video content during storage and playback on systems with open buses receives a multiplexed signal, including a plurality of A/V signals and decryption keys. Following a request for a channel, a single scrambled A/V signal and its associated decryption keys are extracted from the multiplexed signal. The decryption keys are PCX-encrypted while the scrambled signal remains untouched. Both the encrypted decryption keys and the scrambled signal are stored on the system. During storage, the surreptitious piracy of the signals may be avoided.

15 Claims, 5 Drawing Sheets

PROTECTING AUDIO/VIDEO CONTENT DURING STORAGE AND PLAYBACK ON A PROCESSOR-BASED SYSTEM

BACKGROUND

This invention relates to systems for receiving audio and video signals and, more particularly, to systems which may store audio/video information.

A television set may receive an audio/video, or A/V, signal, which combines audio and video data. Increasingly, the A/V signal may be combined with other content, such as closed caption messages, program sub-titles, and even web pages. The A/V signal may enter the television set from a cable wire, a broadcast signal, or from a satellite signal, to name a few.

For example, the television set may receive a variety of programming choices from the connection of a single cable wire. This is so because a cable service provider receives multiple signals, typically from multiple content providers and combines the signals together. The service provider may then broadcast the multiplexed signal over the single cable wire, which may then reach hundreds of thousands of homes.

Both the service provider (cable company) and the content providers (network studios) generate revenue from the content of the multiplexed signal. Accordingly, to prevent piracy, the signal is typically encoded or encrypted during transmission. At the receiving end of the cable wire, a "cable box" or other mechanism may descramble or decrypt the signal for each paying household.

Although television sets are well-known receivers of signals from cable service providers or other sources, other receivers are becoming more widely available. For example, a set-top box is a processor-based system that works with a television set. Set-top boxes are emerging as popular enhancements to television sets because they add features traditionally associated with personal computers to the television experience. For one, set-top boxes may include random access non-volatile storage capability, such as hard disk drives, compact disk read only memories (CD ROMs), or digital video disk random access memories (DVD RAMs).

Broadcast store and replay, or BSR, is the ability of a receiver, such as a set-top box, to locally store portions of an audio/video signal, whether for short periods of time or for extended periods. Similar to using a video cassette recorder, or VCR, a set-top box user may store audio/video content on the random access storage of the set-top box itself.

Audio/video, or A/V, content, stored on the set-top box, may be time-shifted. In other words, much like VCR tapes, the stored content may be played some time after being broadcast. Until the content is retrieved for viewing, it remains stored in the set-top box.

Particularly for receivers which are connected to a network, the stored A/V content of a receiver may be vulnerable to surreptitious behavior, such as piracy. The media storing the A/V content may be connected to other circuitry by a bus. If the bus is open, e.g., accessible to other software or hardware, the A/V content may be copied.

For example, some receivers may include a peripheral component interconnect, or PCI, bus. The PCI bus is compliant with the PCI Local Bus Specification, Revision 2.2 (Jun. 8, 1998, available from the PCI Special Interest Group, Portland, Oreg. 97214). The PCI bus is an open bus with well-known, publicly available specifications.

Alternatively, the media of the receiver may be removable, such as those including a removable hard disk drive. With removable media, the stored A/V content may be sent to another receiver. Thus, for some receivers, the stored A/V content may be stolen.

Further, for receivers which are connected to other receivers, the stored A/V content may be downloaded to another site without leaving evidence of having been downloaded. An entire network of receivers, for example, may potentially retrieve the stored content from a single paying site.

Thus, there is a continuing need to provide protection for revenue-generating or other protection-needing audio/video content when stored on the random access media of a set-top box.

SUMMARY

In accordance with one embodiment of the invention, a method includes intercepting a first signal from a video transmission, extracting a second signal from the first signal, encrypting the second signal and storing the encrypted second signal.

Advantages and other features of the invention will become apparent from the following description, the drawings, and the claims.

DETAILED DESCRIPTION

In the following description, numerous details are set forth to provide an understanding of the present invention. However, it is to be understood by those skilled in the art that the present invention may be practiced without these details and that numerous variations or modifications from the described embodiments may be possible. For example, although reference is made to audio/video signals from a cable wire, such signals may alternatively be broadcast and received by a television antenna, sent via satellite and received by a satellite receiver, or sent across a network to a receiver. Further, it is contemplated that other forms of transmission with content that includes audio or video signals (e.g., television content) may be included in further embodiments.

As used in this description, the term audio/video (A/V) content is intended to include any type of audio and/or video data that may be transmitted or distributed to one or more receiving sites for presentation to viewers and/or listeners. An example of A/V content is television content. As used here, A/V content may refer to content that may include both an audio and video portion or one of an audio and video portion.

Before being captured by a receiver as a single multiplexed signal, a number of content providers may provide single channel A/V signals to a service provider. The service provider may be a cable company, a satellite service provider, or a network administrator, as examples. The content providers may include cable networks, such as Cable News Network (CNN) or Home Box Office (HBO). The signals received by the service provider may each include network programming, movies, live performances, news programs, animation, and other broadcasts.

A signal transmitting television programs or movies may include an enormous amount of audio and video, or A/V, data. To achieve a higher bit rate of transmission, a stream of A/V data may first be compressed. The compression may be performed by the content provider, prior to being sent to the service provider, for example.

The service provider, upon receiving signals from a number of sources, typically adds distinct "codes" or "keys" to the video stream, and scrambles each signal in the video stream. This makes the keys for descrambling the signal available to a descrambler, at the receiving end of the signal.

Figure 1:
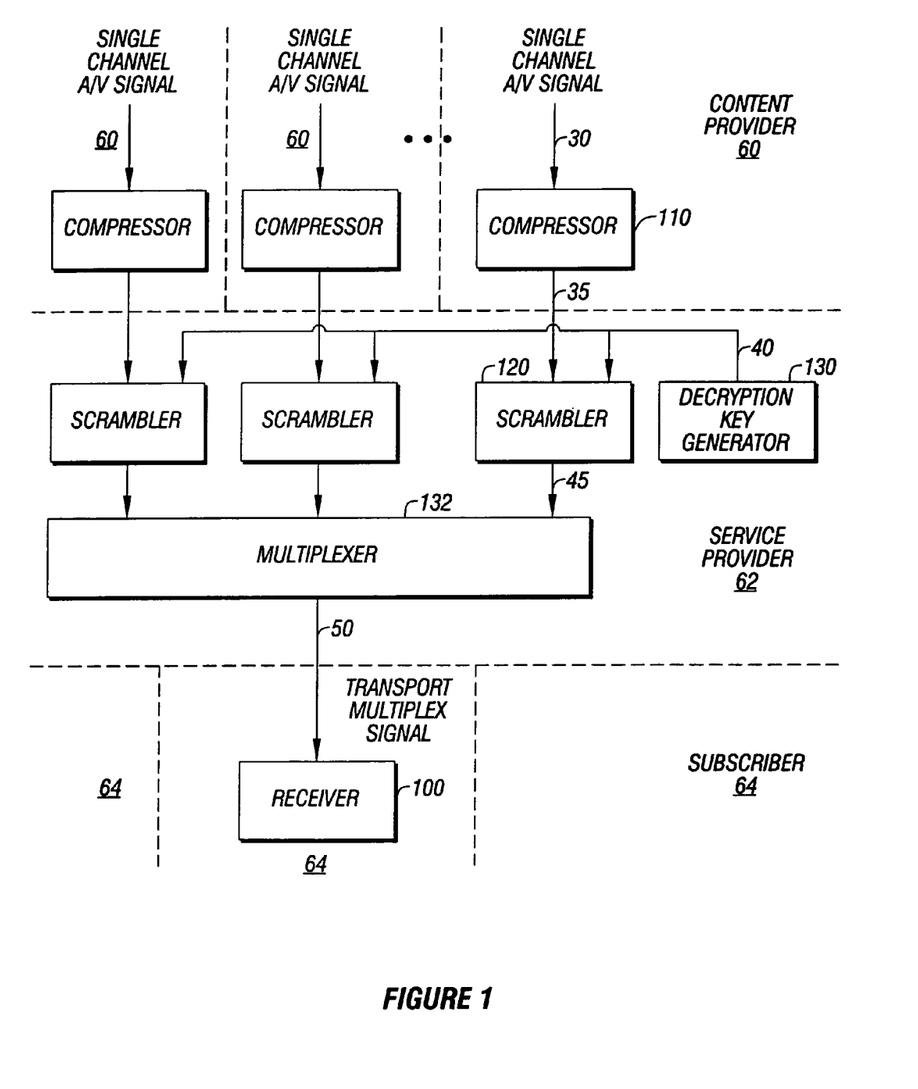
FIG. 1 is a block diagram of the route taken by a plurality of single channel A/V signals before being submitted to a receiver according to one embodiment of the invention.

In FIG. 1, a multiplexed transport signal 50, to be sent to a receiver 100, may begin as a plurality of single channel audio/video, or A/V, signals 30, according to one embodiment of the invention. Each single channel A/V signal 30 may be received from one or more content providers 60, such as CNN, to a service provider 62, such as a local cable company.

The single channel A/V signals 30 each enter a compressor 110. In the embodiment of FIG. 1, the signals 30 are compressed prior to being received by the service provider 62. Each compressor 110 may employ one or more of a variety of available compression schemes. For example, the Moving Picture Experts Group, or MPEG, has approved several compression schemes. MPEG-2 refers to International Organization for Standardization (ISO) and International Electrotechnical Commission (IEC) Standard 13818-1 (systems), 13818-2 (video), 13818-3 (audio) and 13818-4 (compliance) (1994).

From each compressor 110, a compressed single channel A/V signal 35 is produced. The plurality of compressed single channel A/V signals 35 are sent to the service provider 62 for further processing. The signals 35 may be transmitted by satellite, across a network, or may be broadcast terrestrially to the service provider 62 from the content provider 60. Alternatively, the single channel A/V signal 30 may be compressed after reaching the service provider 62.

At the service provider 62, each compressed signal 35 may enter a scrambler 120 for encrypting the signal 35. For example, the scrambler 120 may be a digital video broadcast (DVB) scrambler 120. DVB refers to European Telecommunication Standards Institute (ETS) Standard 300-421 (satellite), 300-429 (cable), 300-744 (terrestrial), and 300-800 (interactive television) (1995).

Additionally, the service provider 62 may add "keys" or "codes" to the signals 35, such that the signals 35 may be descrambled somewhere downstream, e.g., by paying subscribers 64. Thus, the service provider 62 may use a decryption key generator 130 to produce a plurality of decryption keys 40, also to be sent to the scramblers 120. Typically, the decryption keys 40 change frequently. For example, some cable service providers may produce a new set of decryption keys for each channel twice every second.

Each scrambler 120 scrambles the compressed signal 35, then couples the scrambled and compressed signal with a decryption key 40, to produce a new signal 45. The signal 45 may then be combined with other compressed, scrambled, single channel A/V signals 45.

The plurality of signals 45 may enter a multiplexer 132, where the signals 45 may be combined to form one signal 50. The multiplexed signal 50, suitable for wide-spread transmission to a plurality of subscribers 64, is known as a multiplexed transport (or broadcast) signal 50. The multiplexed transport signal 50 includes compressed and scrambled signals from potentially many A/V channels.

At the receiving end, a number of subscribers 64 with receivers 100, such as television sets or set-top boxes, may receive the multiplexed transport signal 50. Inside each receiver 100, the process described in FIG. 1 is essentially reversed before a single channel may be viewed.

Some A/V receivers, such as set-top boxes, may include a broadcast store and replay (BSR) feature which enables A/V content to be time-shifted. In the receiver, the A/V signal may be stored on a random access storage medium, such as a hard disk drive, a CD ROM drive, a DVD RAM drive, and so on. For receivers with random access storage medium coupled to an open bus, such as a PCI bus, the contents of the random access storage medium, including the A/V signal, may be available to others besides the paying subscriber of the A/V content.

According to one embodiment of the invention, a receiver, such as a set-top box, enables secure BSR by encrypting the decryption keys inside the receiver. The channel signals remain as provided to the receiver, compressed and scrambled, for example, while inside the receiver, until such time as the signals are to be viewed. Both the channel signals and the encrypted keys are then stored on random access media in the receiver.

Because the decryption keys are used to unscramble the channel signals, encrypting the keys prior to storage may discourage the copying of both sets of signals. Both the channel signal and its associated decryption keys are necessary for experiencing the A/V content of a channel. Yet, when one signal is "locked," the misappropriation of the other signal may be fruitless. Further, the scrambling scheme of the content provider remains intact during storage and playback of the channel signal upon the receiver.

Figure 2:
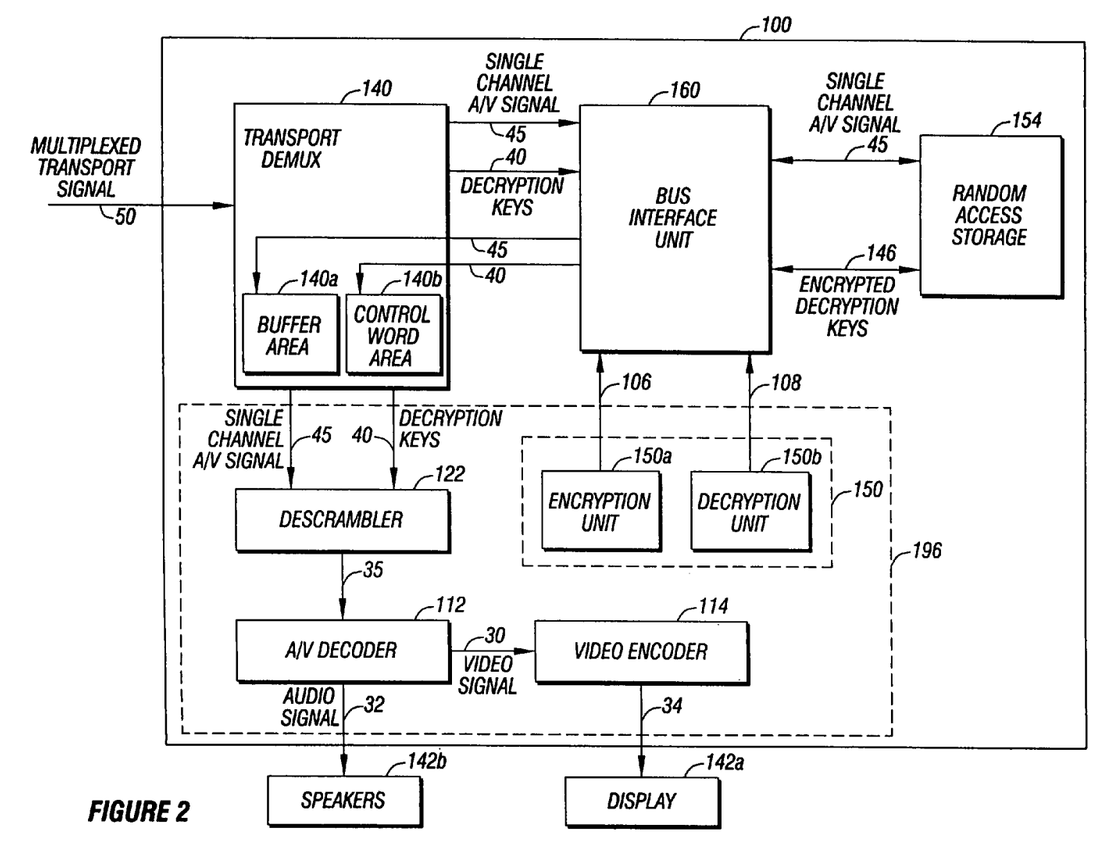
FIG. 2 is a block diagram of a receiver according to one embodiment of the invention.

In FIG. 2, the receiver 100 includes circuitry for reversing the operations performed on the single channel A/V signals 30 of FIG. 1, according to one embodiment of the invention. That is, as will be shown, the multiplexed transport signal 50 is demultiplexed, descrambled, and decompressed, before being experienced as intended. Additionally, the receiver 100 includes circuitry for both storing and replaying the A/V transmission, known also as broadcast store and replay (BSR).

In FIG. 2, a transport demultiplexer 140 receives the multiplexed transport signal 50, such as one sent to the subscriber 64 from the service provider 62 (FIG. 1). Upon receiving a channel request, the multiplexed transport signal 50 is demultiplexed into both the requested single channel A/V signal 45 and its associated decryption keys 40.

For real-time channel requests, e.g., to view the signal 45 immediately, the single channel A/V signal 45 and its associated decryption keys 40 may enter a descrambler 122. Accordingly, the single channel A/V signal 45 and the decryption keys 40 are sent to a multi-function chip 196, which includes circuitry for preparing the signals 45 and 40 for viewing.

The single channel A/V signal 45 and the decryption keys signal 40 may also be stored by the receiver 100. The storage of the signals 40 and 45 enable time-shifted requests, e.g., BSR requests to store the A/V content of a particular channel, to be made by the receiver 100.

Thus, in FIG. 2, from the transport demultiplexer 140, the single channel A/V signal 40 and its associated decryption keys 45 may enter a bus interface unit 160. In one embodiment of the invention, the bus interface unit 160 is a PCI bus interface unit. The PCI bus interface unit 160 further receives a key 106 from an encryption unit 150a. In one embodiment of the invention, the encryption unit 150a may be part of the multi-function chip 196.

In one embodiment of the invention, the encryption unit 150a is a protected content exchange, or PCX cipher unit. In a second embodiment of the invention, the encryption unit 150a is a Data Encryption Standard, or DES, encryption unit. In a third embodiment of the invention, the encryption unit 150a is a Rivest, Shamir and Adelman, or RSA, encryption unit. The encryption unit 150a may employ a variety of other encryption algorithms as well.

In the PCX encryption embodiment, the decryption keys 40 are PCX-encrypted inside the PCI bus interface unit 160, using the PCX encryption key 106. Once encrypted, an encrypted decryption keys signal 146 is produced. The single channel A/V signal 45, also entering the PCI bus interface unit 160 remains untouched during encryption of the decryption keys 40.

From the PCI bus interface unit 160, the single channel A/V signal 45 enters a random access storage unit 154. The newly encrypted decryption keys signal 146 also enters the random access storage unit 154. Thus, the local storage of the single channel A/V signal 45 as well as the encrypted decryption keys 146 is complete.

Simultaneous to the storage operation, a selected one of a plurality of single channel A/V signal 45 and the decryption keys signal 40 may enter the descrambler 122. In one embodiment of the invention, the descrambler 122 is a digital video broadcast (DVB) descrambler and is part of the multi-function chip 196.

From the descrambler 122, a descrambled, but still compressed, single channel A/V signal 35 emerges. The single channel A/V signal 35 enters an A/V decoder 112, where the signal 35 is decompressed. The decompressed signal is also divided into a video signal 30 and an audio signal 32 inside the A/V decoder 112. The audio signal 32 is ready for submission to an audio receiver 142b, such as to speakers 142b.

Because video displays are typically analog-based, the multi-function chip 196 of FIG. 2 further includes a video encoder 114. The video encoder 114 does not encode the video signal 30, but translates the video signal 30 from a digital signal 30 to an analog signal 34. The video encoder 114 thus receives the video signal 30 and produces a video signal 34 which may be received by a display 142a, outside the receiver 100. For digital video displays, the video encoder 114 may be bypassed.

Thus, a descrambled, decompressed, and possibly translated video signal 34 enters the video display 142a while the descrambled and decompressed audio signal 32 is received by the speakers 142b. The multi-function chip 196 further may include circuitry to coordinate the asynchronous submissions such that the subscriber 64 may enjoy the A/V experience as intended.

While the single channel A/V signal 45 and the encrypted decryption keys 146 are stored in the random access storage medium 154, the information may be retrieved by software or hardware which has access to the PCI bus (not shown). Alternatively, the receiver 100 may include a removable random access medium 154, such as a removable hard disk drive, possibly making the stored information available to entities besides the receiver 100. Or, if the receiver 100 is connected to other systems, such as on a network, for example, the stored information may be accessible by other entities. However, because the decryption keys 146 are encrypted, the scrambled A/V signal 45 may not be descrambled until the keys 146 are decrypted. Thus, the value of the stored information may be limited to an entity capable of decrypting the encrypted decryption keys 146, e.g., the receiver 100 itself.

In FIG. 2, the replay mechanism of BSR may be invoked in response to a request to replay an A/V channel which was previously stored on the receiver 100. In one embodiment of the invention, the replay operation includes receiving both the single channel A/V signal 45 and the encrypted decryption keys 146 from the random access storage unit 154 into the bus interface unit 160. Accordingly, two-way arrows connect between the bus interface unit 160 and the random access storage unit 154, in FIG. 2.

The PCI bus interface unit 160 is coupled to a decryption unit 150b, from which a decryption key 108 may be received. Due to the symmetry of encryption/decryption schemes, the decryption unit 150b may be part of an encryption/decryption unit 150, also including the encryption unit 150a. Alternatively, the decryption unit 150b may be a distinct functional unit. In the embodiment of FIG. 2, both the encryption unit 150a and the decryption unit 150b are part of the multi-function chip 196 inside the receiver 100.

The encrypted decryption keys 146 may be decrypted inside the PCI bus interface unit 160. In one embodiment of the invention, the decryption unit 150b performs PCX decryption. In another embodiment of the invention, the decryption unit 150b performs an operation to reverse the encryption performed by the encryption unit 150a. Using the decryption key 108 from the decryption unit 150b, one or more decryption keys 40 may be produced. The decryption keys signal 40 produced in the PCI bus interface unit 160 may be identical to that supplied by the service provider 62 (FIG. 1).

In one embodiment of the invention, the single channel A/V signal 45 leaves the PCI bus interface unit 160 and enters a buffer area 140a. The decryption keys signal 40 likewise leaves the PCI bus interface unit 160 and enters a control word area 140b.

In one embodiment of the invention, the buffer area 140a and the control word area 140b are essentially memory regions inside the transport demultiplexer 140. Such use of the transport demultiplexer 140 may be beneficial because the memory regions 140a and 140b are not addressable by hackers and may thus be impervious to attack. However, other memory regions in a processor-based system may instead receive the signals 40 and 45.

In one embodiment of the invention, the buffer area 140a and the control word area 140b are repositories for the temporary storage of the single channel A/V signal 45 and the decryption keys 40, respectively. These regions 140a and 140b of the transport demultiplexer 140 may thus be "staging areas" for presentation of the signals to other circuitry of the receiver 100.

For example, the descrambler 122 expects two inputs: a signal to be descrambled and a keys signal for descrambling the first signal. The staging areas enable the two signals to independently reach the transport demultiplexer 140, such that the two signals 40 and 45 may be presented simultaneously to the descrambler 122.

Accordingly, in FIG. 2, from the buffer area 140a and the control word area 140b, the single channel A/V signal 45 and the decryption keys 40 enter the descrambler 122, in one embodiment of the invention. The descrambler 122, the A/V decoder 112, and the video encoder 114, operate just as for the real-time transmission of the channel signal, described above.

Figure 3:
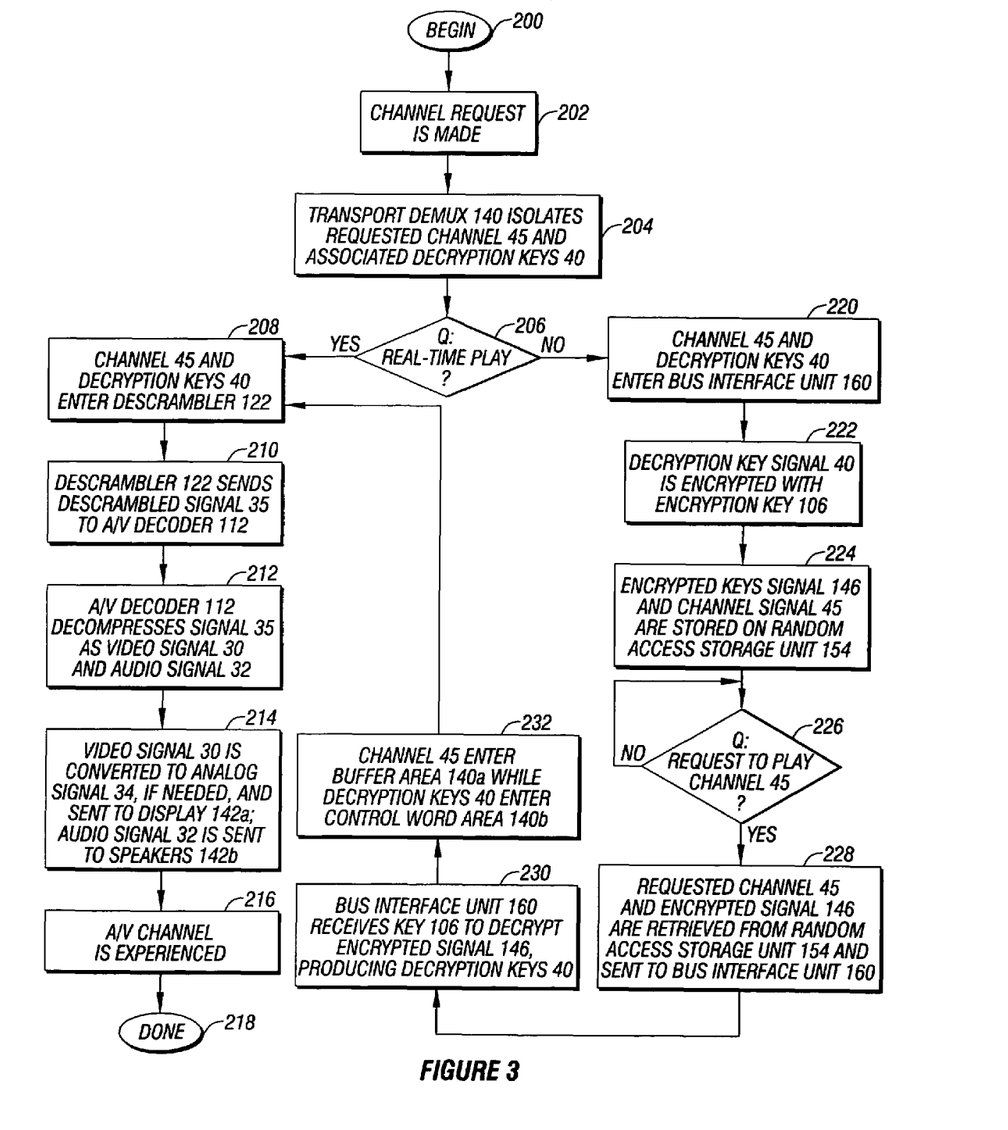
FIG. 3 is a flow diagram illustrating broadcast store and replay according to one embodiment of the invention.

In FIG. 3, a flow diagram illustrates how the receiver 100 may process either a real-time request for a channel to be played, or the channel may be stored for later play. The multiplexed transport signal 50 is first received by the receiver 100 when the flow diagram begins (block 200). A request for one of the channels contained in the multiplexed transport signal 50 is made, such as by one of the subscribers 64 (block 202). The transport demultiplexer 140 then isolates the requested channel 45 from the plurality of channels in the multiplexed transport signal 50. Also isolated by the transport demultiplexer 140 is the decryption keys signal 40 which is associated with the requested channel 45 (block 204).

The receiver 100 may then either prepare the signal 45 for real-time play or may store the signal for later play, a time-shifted experience (diamond 206). If real-time play was requested, the channel 45 and the decryption keys signal 40 enter the descrambler 122 (block 208). The descrambler 122 uses the decryption keys 40 to descramble the channel signal 45, and produce the descrambled signal 35.

The descrambler 122 sends the descrambled signal 35 to the A/V decoder (block 210). The A/V decoder 112 then decompresses the signal 35, producing the video signal 30 and the audio signal 32 (block 212). The video signal 30 may be sent to the video encoder 114, where the digital video signal 30 is translated to an analog video signal 34. Subsequently, the analog video signal 34 is sent to the display 142a (block 214). Where a digital display is used, no translation from digital signal 30 to analog signal 34 is needed.

The audio signal 32 is both descrambled and decompressed and is thus capable of being experienced. Accordingly, the audio signal 32 is sent to the speakers 142b (block 214). The A/V channel is thus experience (block 216).

Alternatively, the request to store the signal channel A/V signal 45 may have been made (diamond 206). Accordingly, the single channel A/V signal 45 and its associated decryption key signal 40 enter the bus interface unit 160 (block 220). The decryption key signal 40 is then encrypted with the encryption key 106, which is sent to the bus interface unit 160 (block 222). Accordingly, an encrypted decryption key signal 146 is produced in the bus interface unit 160.

The encrypted keys signal 146 and the unchanged channel signal 45 are then stored in a random access storage unit 154 (block 224). The channel signal 45 remains scrambled as intended by the content provider 60 or the service provider 62. The random access storage unit 154 may include a variety of devices, such as hard disk drives, flash memory, or DVD-RAM devices.

Until a request to play the now stored signal channel A/V signal 45 is made, the channel signal 45 remains in the random access storage unit 154 (diamond 226). However, once a request to play the channel 45 is made, the stored A/V channel 45 and the encrypted signal 146 are retrieved from the random access storage unit 154. From there, the signals 45 and 146 are sent to the bus interface unit 160 (block 228).

The bus interface unit 160 receives the key 106, from the decryption unit 150b, used to decrypt the encrypted signal 146. This decryption process produces the decryption keys signal 40 (block 230). The single channel A/V signal 45 enters the buffer area 140a while the decryption keys 40 enter the control word area 140b (block 232). As described above, these regions 140a and 140b serve as staging areas for the single channel A/V signal 45 and the decryption keys signal 40, for presentation to the descrambler 122. In one embodiment of the invention, the buffer area 140a and the control word area 140b are part of the transport demultiplexer 140.

The subsequent processing by the receiver 100 proceeds just as is the case for real-time play, as described above. That is, the descrambler 122 receives the single channel A/V signal 45 and the decryption key signal 40 (block 208), from the areas 140a and 140b. The descrambled signal is then sent to the A/V decoder 112 (block 210), the A/V decoder 112 decompresses the signal 35 (block 212), and the signal 30 is sent to the video display and speakers 142 (block 214). Finally, the requested A/V channel 30 is experienced (block 216). Thus, whether in a real-time or a time-shifted manner, the receiver 100 is able to fulfill the channel request.

Figure 4:
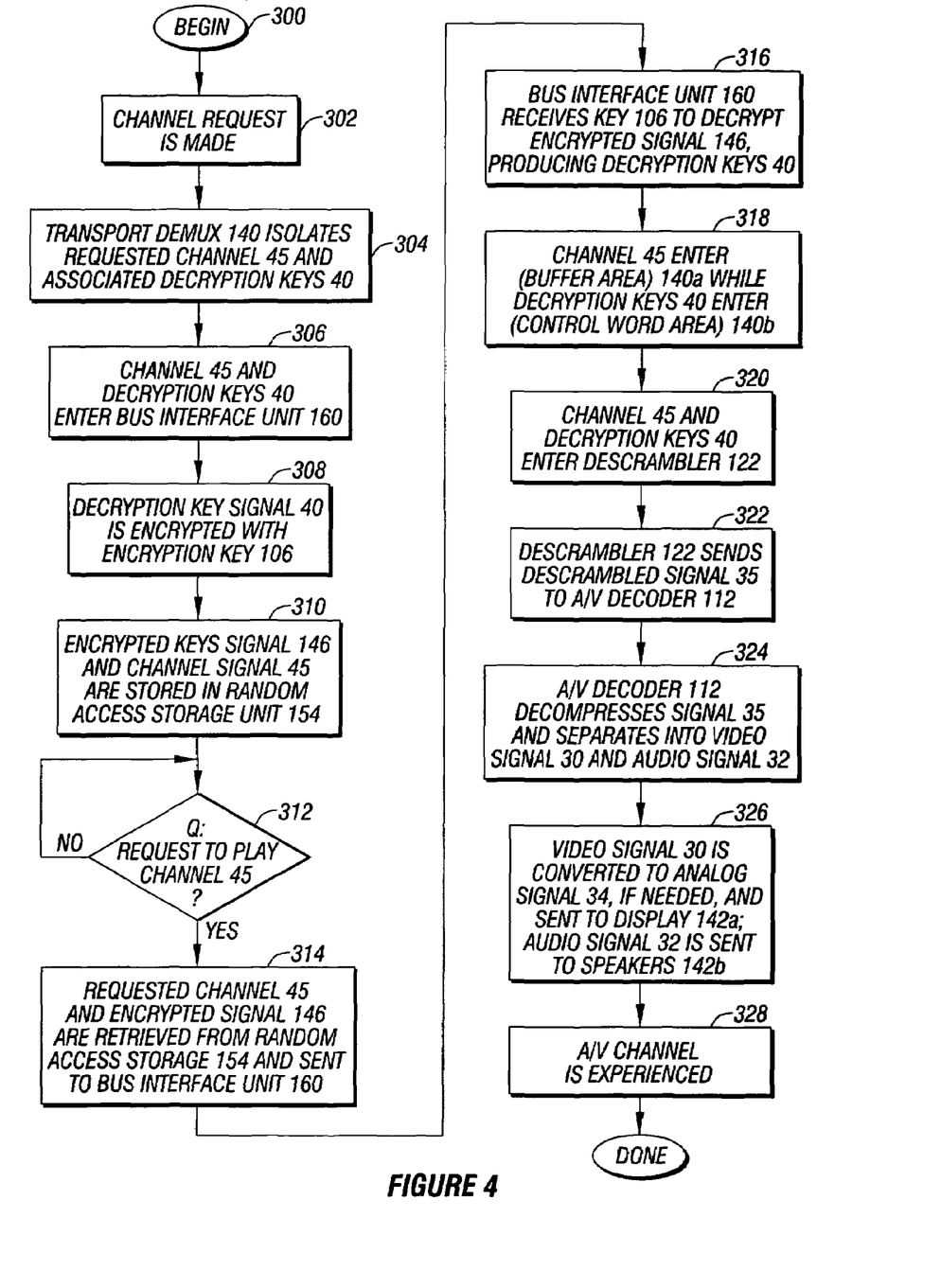
FIG. 4 is a flow diagram illustrating broadcast store and replay according to a second embodiment of the invention.

In FIG. 4, a flow diagram illustrates a second embodiment for implementing the receiver 100 according to the invention. Again, the receiver 100 may both store a requested channel for later viewing and prepare the channel for real-time A/V experience. This time, however, the receiver 100 automatically stores the requested A/V channel information prior to any viewing by the subscriber 64.

As in FIG. 3, the multiplexed transport signal 50 is sent to the receiver 100 (block 300). A request for one of the channels contained in the multiplexed transport signal 50 is made, such as by the subscriber 64 (block 302). The transport demultiplexer 140 then isolates the requested channel 45 from the plurality of channels in the multiplexed transport signal 50. Also isolated by the transport demultiplexer 140 is the decryption keys signal 40 associated with the requested channel 45 (block 304).

Upon receiving both the requested channel 45 and its decryption keys 40, the receiver 100 stores the signal for later play, as a time-shifted experience as well as preparing the signal for real-time play. Accordingly, in one embodiment of the invention, the single channel A/V signal 45 and its associated decryption keys signal 40 enter the bus interface unit 160 (block 306).

The decryption keys signal 40 is then encrypted with the encryption key 106, which is sent to the bus interface unit 160 (block 308), to produce an encrypted decryption keys signal 146. The encrypted keys signal 146 and the unchanged channel signal 45 are then stored in the random access storage unit 154 (block 310).

In the embodiment of FIG. 4, the subscriber 64 may at this time replay the A/V channel which has been stored. Accordingly, if a request to play an A/V channel 45 is made (diamond 312), the requested channel 45 and the encrypted signal 146 are retrieved from the random access storage unit 154 and sent to the bus interface unit 160 (block 314).

If, instead, no request to play a channel is made, the storage is complete. The receiver 100 performs no further activity, until such time as a request to play the channel 45 is made (diamond 312).

After receiving the signals 45 and 146, the bus interface unit 160 receives the key 106, from the decryption unit 150b, used to decrypt the encrypted signal 146. Decryption inside the bus interface unit 160 produces the decryption keys signal 40 (block 316). The single channel A/V signal 45 enters the transport demultiplexer (buffer area) 140a while the decryption keys 40 enter the transport demultiplexer (control word area) 140b (block 318).

The descrambler 122 receives the single channel A/V signal 45 and the decryption keys signal 40 (block 320), from the transport demultiplexer memory regions 140a and 140b, respectively. The descrambler 122 uses the decryption keys 40 to descramble the channel signal 45, producing the descrambled signal 35. The descrambler 122 sends the descrambled signal 35 to the A/V decoder 112 (block 322). The A/V decoder 112 decompresses the signal 35, then separates out the video signal 30 and the audio signal 32

(block 324). The digital video signal 30 (or the analog video signal 34, depending on the display type) is sent to the video display 142a while the audio signal 32 is sent to the speakers 142b (block 326). The requested A/V channel is thus experienced (block 328).

Figure 5:
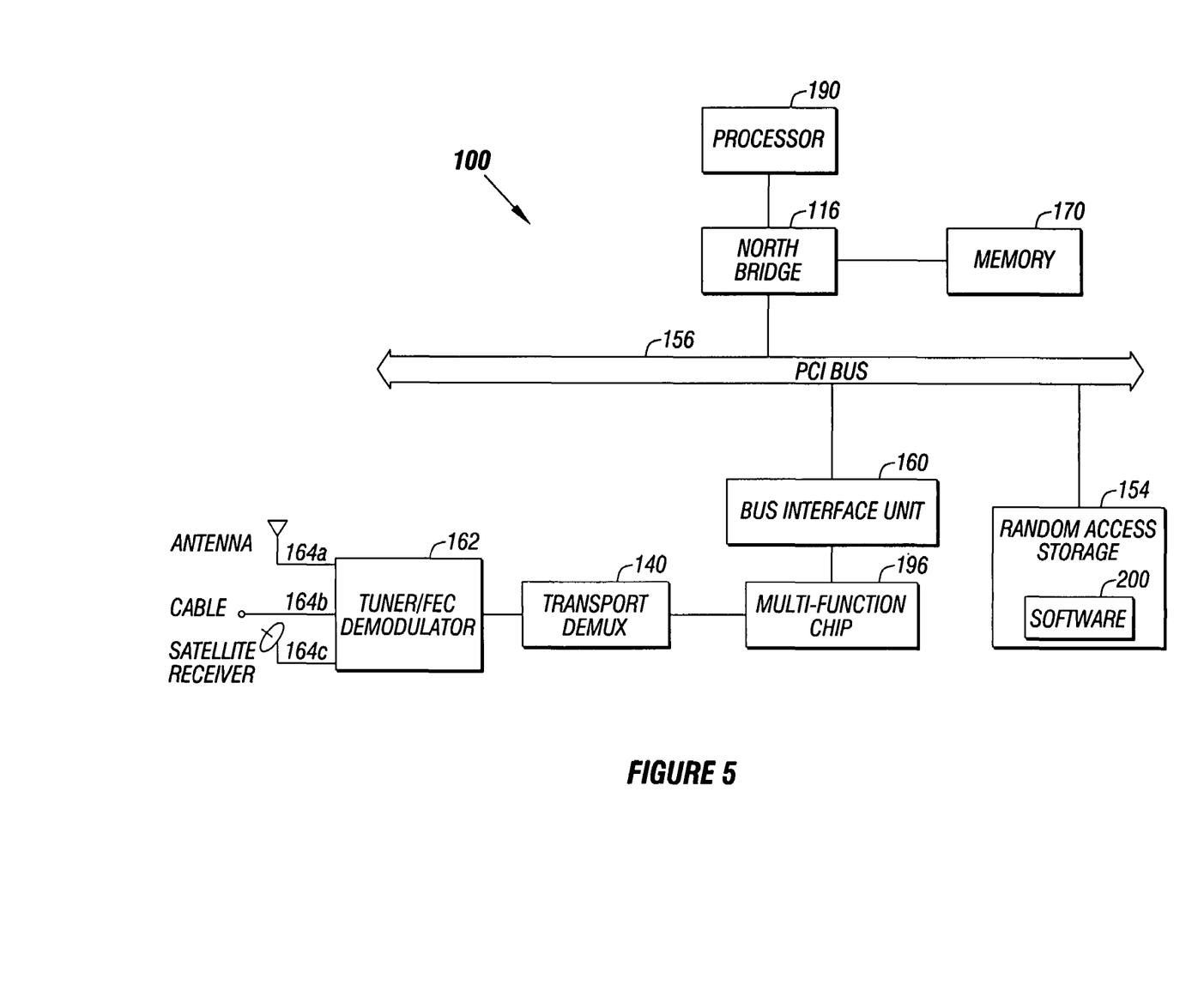
FIG. 5 is a block diagram of a computer system useful in implementing one embodiment of the present invention.

In FIG. 5, a hardware implementation for one embodiment of the invention includes a processor 190 coupled to a north bridge 116. A memory 170 is also connected to the north bridge 116. The north bridge 116 is further connected to a PCI bus 156.

Connected to the PCI bus 156 is the bus interface unit 160. The bus interface unit 160 is also coupled to the multi-function chip 196. In one embodiment of the invention, the multi-function chip 196 provides many of the features introduced above. For example, the multi-function chip 196 performs the functions of the descrambler 122, the A/V decoder 112, the encryption/decryption unit 150, and the video encoder 114.

The multi-function chip 196 is further coupled to the transport demultiplexer 140 described above. The transport demultiplexer 140 is connected to a tuner/forward error correction, or FEC, demodulator 162 which is coupled to either an antenna 164a, a cable 164b or a satellite receiver 164c. The tuner/FEC demodulator 162 may perform a video capture function for the receiver 100.

The PCI bus 156 further may connect to the random access storage unit 154 from FIG. 2. The random access storage medium 154 may be a hard disk drive, a flash memory, a CD-ROM, or a DVD-RAM device, as examples. A software program 200, as described in the flow diagram of FIG. 3, may be stored in the random access storage unit 154, in one embodiment of the invention.

Thus, a system and method for providing secure storage of audio/video content on receivers with open buses is disclosed. When a multiplexed transport signal is spliced into individual channel signals and decryption code signals, the codes may then be encrypted before storage of both signals. While being stored in a random access medium, the A/V content remains in the scrambled state supplied to the receiver, such as content supplied by a cable service provider. The decryption code signals remain encrypted during storage. Once the stored content is to be replayed, the encrypted decryption codes are decrypted. The descrambler then may receive both the scrambled A/V signal and the decryption keys, just as the signals would be presented during real-time experience of the A/V content.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   intercepting a signal from a video transmission, the signal comprising a scrambled content and a decryption key;
   extracting the decryption key from the signal;
   encrypting the extracted decryption key;
   storing the encrypted decryption key in a memory region that is inside a demultiplexer;
   extracting the scrambled content from the signal; and
   storing the scrambled content separate from the stored encrypted decryption key.

2. The method of claim 1, further comprising:
   receiving a request for the scrambled content to be descrambed;
   retrieving the encrypted decryption key from the memory region;
   decrypting the retrieved encrypted decryption key; and
   using the decrypted decryption key to descramble the scrambled content.

3. The method of claim 1, wherein encrypting the decryption key further comprises using protected content exchange encryption.

4. A system, comprising:
   a bus;
   a bus interface unit coupled to the bus wherein the bus interface unit receives a video signal including a scrambled content and a decryption key;
   a demultiplexer coupled to the bus;
   a memory region that is inside the demultiplexer; and
   a multi-function unit coupled to the bus interface unit including logic to:
     encrypt the decryption key;
     store the encrypted decryption key in the memory region;
     extract the scrambled content from the signal; and
     store the scrambled content separate from the stored encrypted decryption key.

5. The system of claim 4, wherein the multi-function unit further comprises:
   a descrambler; and
   a decoder.

6. The system of claim 5, wherein the descrambler is a digital video broadcast descrambler.

7. The system of claim 5, wherein the decoder is an MPEG decoder.

8. The system of claim 4, wherein the multi-function unit further comprises:
   an encryption unit; and
   a decryption unit.

9. The system of claim 8, the encryption unit further including logic to encrypt the decryption key using protected content exchange-based encryption.

10. The system of claim 8, wherein the decryption unit performs PCX-based decryption.

11. The system of claim 4, wherein the bus is a peripheral component interconnect bus.

12. The system of claim 4, where the video signal is a single channel audio/video signal.

13. An article comprising a medium storing instructions that cause a processor-based system to:
   receive a video signal;
   extract scrambled content and decryption keys from the video signal;
   encrypt the decryption keys;
   store the encrypted decryption keys in a memory region that is inside a demultiplexer; and
   store the scrambled content separate from the encrypted decryption keys.

14. The article of claim 13, further storing instructions that cause a processor-based system to:
   receive a request for the scrambled content;
   retrieve the encrypted decryption keys stored in the memory region;
   decrypt the retrieved encrypted decryption keys; and
   send the scrambled content and the decrypted keys to a descrambler.

15. The article of claim 13, further storing instructions that cause a processor-based system to encrypt the decryption keys using protected content exchange-based encryption.

* * * * *

UNITED STATES PATENT AND TRADEMARK OFFICE
CERTIFICATE OF CORRECTION

| | | |
|---|---|---|
| PATENT NO. | : 7,110,542 B1 | Page 1 of 1 |
| APPLICATION NO. | : 09/475868 | |
| DATED | : September 19, 2006 | |
| INVENTOR(S) | : Tripathy | |

It is certified that error appears in the above-identified patent and that said Letters Patent is hereby corrected as shown below:

In column 9, at line 63, delete "descrambed" insert --descrambled--.

Signed and Sealed this

Tenth Day of April, 2007

JON W. DUDAS
*Director of the United States Patent and Trademark Office*